UNITED STATES PATENT OFFICE.

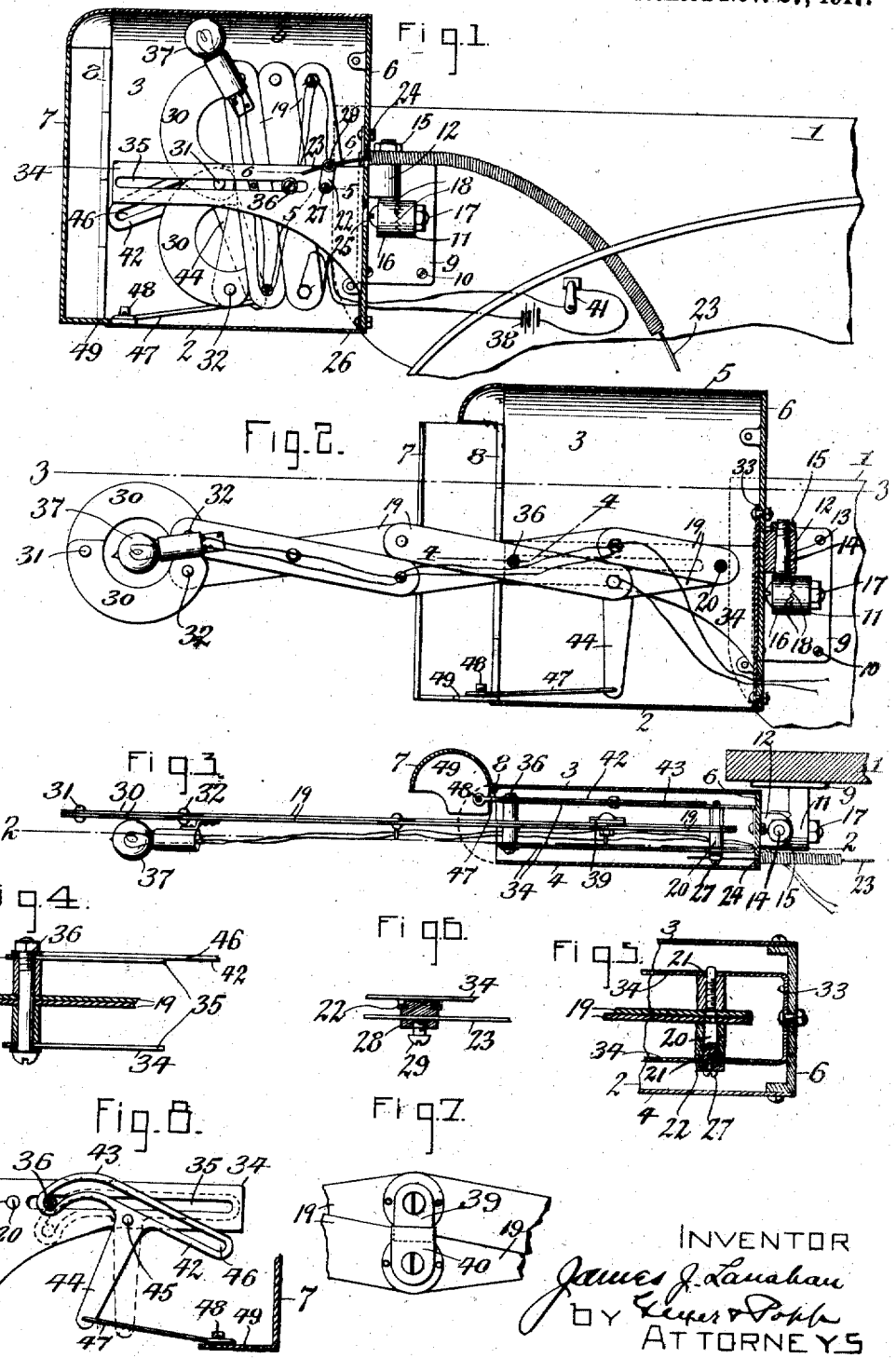

JAMES J. LANAHAN, OF BUFFALO, NEW YORK.

SIGNAL DEVICE FOR VEHICLES.

1,247,845.   Specification of Letters Patent.   Patented Nov. 27, 1917.

Application filed October 29, 1915. Serial No. 58,574.

*To all whom it may concern:*

Be it known that I, JAMES J. LANAHAN, a citizen of the United States, residing at Buffalo, in the county of Erie and State of New York, have invented new and useful Improvements in Signal Devices for Vehicles, of which the following is a specification.

This invention relates to a signal device for use on automobiles or other vehicles which permits the driver to notify pedestrians or drivers of other vehicles what direction the particular driver giving the signal is about to take and also whether or not this driver is about to stop, and thereby avoid accidents.

The object of this invention is to produce a signal of this character in which the principal working parts are thoroughly protected when not in use, which can be mounted upon automobiles of various constructions without requiring any change in the fittings of the signal device, which does not detract from the appearance of the vehicle, and in which the lid or door of the inclosing casing for the principal working parts is positively locked in its open and closed positions so as to avoid interference with the signaling mechanism.

In the accompanying drawings: Figure 1 is a vertical longitudinal section of my improved signaling device showing the same in its inoperative position, the section being taken on one side of the supporting bracket upon which the semaphore arm is guided within the inclosing casing. Fig. 2 is a similar view showing the signal mechanism in its operative position, this section being taken through the supporting bracket on which the semaphore arm is guided, on line 2—2, Fig. 3. Fig. 3 is a horizontal section taken on line 3—3, Fig. 2. Fig. 4 is a fragmentary horizontal section, on an enlarged scale, taken on line 4—4, Fig. 2. Figs. 5 and 6 are fragmentary horizontal sections, on an enlarged scale, taken on the correspondingly numbered lines in Fig. 1. Fig. 7 is a fragmentary elevation, on an enlarged scale, showing the switch for automatically opening and closing the electric circuit of the signal lamp. Fig. 8 is a fragmentary sectional elevation of the supporting bracket for the semaphore arm and the lid operating mechanism taken from the side opposite to that shown in Fig. 1.

Similar characters of reference indicate corresponding parts throughout the several views.

My improved signaling device is applicable to any suitable available part of an automobile or vehicle but as shown in the drawings the same is mounted on the dash board 1 of the vehicle so that the same is within easy reach of the driver occupying the seat of the vehicle. In practice two of these signaling devices are preferably employed, one at the right hand side of the dash board and another at the left hand side thereof so as to permit the driver to either operate both signals at the same time and thereby indicate to pedestrians or the drivers of other vehicles that the respective car is about to stop, or one of these signals may be operated to the exclusion of the other for indicating to other persons the direction in which the respective car is about to turn. Inasmuch as these signal devices are identical in construction only one of them is shown in the drawings, the same being mounted at the left hand side of the dash board.

The inclosing casing or housing which is adapted to receive the principal working parts of the signal device preferably comprises a horizontal bottom 2, two longitudinal side walls 3, 4, a top 5, an inner or rear end wall 6, and a horizontally swinging lid or door 7 which is adapted to open or close a passageway at the outer end of the casing, which lid is preferably pivoted at one of its upright edges to the adjacent outer edge of the front side wall of the casing by means of a hinge 8 or other suitable means.

The place which is most suitable or convenient for attaching this signal device varies in different automobiles or other vehicles and an attaching bracket is therefore devised which is so designed that the same is universal and practically permits of mounting the casing of the signal device on any available surface or supporting member of the vehicle and still permit the signal to occupy its normal position when installed. The preferred form of this universal attaching bracket which is shown in the drawings is constructed as follows:

9 represents an attaching plate which is adapted to be secured to the dash board 1 or other supporting surface by means of screws 10, as shown in Fig. 1 or by other suitable means and which is provided with a laterally projecting eye 11. This plate and eye form the outer section of the attaching bracket. 12 represents a supporting lug secured to the outer side of the rear wall of the inclosing casing and provided with an upright bearing opening 13, and forming the inner section of the attaching bracket. 14 represents an upright spindle arranged in the opening 13 and provided at its upper end with an external screw thread which receives a screw nut 15 engaging with the upper side of the lug 12 while its lower end is provided with an eye 16, said spindle and its eye and screw nut forming the intermediate section of the attaching bracket. The spindle and its bearing taper upwardly so that when the nut 14 is tightened the spindle will be held securely against turning in the bearing 13. The eyes 11 and 16 are pivotally connected by means of a horizontal clamping bolt 17 passing through these eyes. By loosening the bolt 17 and the nut 15 the spindle 14 may be turned horizontally and the attaching plate 9 may be turned vertically the required extent to bring the attaching plate into the required angular position relative to the inclosing casing to permit of securing the attaching plate to the desired surface on the automobile. After such adjustment the attaching plate and the inclosing casing are held in this position by tightening the nut 15 of the spindle and the nut of the clamping bolt. As shown in Figs. 1, 2 and 3, the attaching plate is arranged on one side of the casing and in a substantially vertical position. It will be evident, however, that by turning the outer bracket section vertically on the intermediate bracket section and turning the latter horizontally on the inner bracket section, the casing may be adjusted to various angular positions relatively to the vehicle.

For the purpose of aiding the clamping bolt in holding the two eyes in their proper relative position these eyes are provided on their cooperating sides with serrations or teeth 18 which are adapted to interlock and hold the attaching plate reliably in the desired position relatively to the spindle and the signal casing mounted thereon.

A semaphore or signal arm is arranged within the casing which is preferably so constructed that it may be projected outwardly through the passage way at the front end of the casing or retracted within the latter, this arm being provided with means which enable the same to be used as a day signal and also as a night signal. In its preferred form this arm is composed of a plurality of pairs of levers or links 19 the members of each pair being crossed and pivotally connected and also pivotally connected with other adjacent pairs of such levers or links so that upon moving these several pairs of links in a direction for causing them to assume an approximately horizontal position, this arm as a whole will be extended horizontally while upon moving the same so that they assume a more nearly vertical position these links will be folded relatively to each other and the arm as a whole will be contracted or shortened, in the manner of lazy tongs. The innermost pair of links of this extensible and contractible semaphore arm are mounted on a horizontal rock shaft 20 which is journaled in relatively fixed bearings 21, the innermost of the pair of links being mounted loosely on this shaft while the companion link is connected with this shaft so as to turn therewith, whereby upon rocking this shaft the several pairs of links will be caused to fold and unfold and the semaphore arm to be either contracted within the casing or projected laterally through the passageway at the front end thereof. This rocking movement may be imparted to the shaft 20 in any suitable manner from any desired part of the car. For instance, as shown in Figs. 1, 3 and 6, this may be effected by providing the rock shaft with a crank arm 22 to which is attached a flexible shipper rod 23 which latter may be moved lengthwise in either direction for causing the rock shaft to oscillate and either project or retract the semaphore arm. This shipper rod may be passed through an opening 24 in the upper part of the rear wall of the casing, as shown in Fig. 1, or through an opening 25 in the lower part of this rear wall, or through an opening 26 in the bottom of the casing for the purpose of adapting the signal device to different constructions or conditions which may be encountered in various vehicles. To perm of thus varying the position of the shipper rod relative to the casing,—the crank arm 22 is adjustably secured to the crank shaft by means of a screw 27 or otherwise so as to permit of arranging the same on this shaft in the required position to permit the movement of the shipper rod to be properly transmitted to the crank arm. The connection between this crank arm and the shipper rod may be variously constructed, that shown in Figs. 1 and 6 being preferred and consisting of a wrist 28 pivotally mounted on the outer end of the crank arm and provided with a socket in which the inner end of the shipper rod is adjustably secured by means of a screw 29.

On the outer ends of the outermost pair of links of the semaphore or signal arm is mounted a signal head which operates as a direction signal during the day time when projected from the casing. This signal head preferably comprises two semi-circular ring sections 30 which have their outer ends pivotally connected with each other by means of a rivet or pin 31, while their inner ends are pivotally connected respectively by means of pins or rivets 32 with the outer ends of the outermost pair of links of the semaphore arm. Upon projecting the semaphore arm from the casing the two sections of the signal head together form practically a complete ring, as shown in Fig. 2, so that the same serves as a day signal. Upon retracting the semaphore arm within the casing the two sections of the signal head are unfolded or spread apart into approximately the shape of the numeral 3, as these sections follow the movement of the retracting semaphore links, as shown in Fig. 1. Various means may be provided for supporting the rock shaft and the links of the semaphore arm and guiding these links while the same are projected or retracted. The preferred means for this purpose which are shown in the drawings consist of a supporting and guiding bracket which is arranged within the casing and which comprises an upright base plate 33 secured to the inner side of the rear wall of the casing, and two arms 34 arranged lengthwise on opposite sides of the semaphore links and provided with the bearings 21 on their inner parts in which the opposite ends of the rock shaft are journaled while their outer parts are provided with longitudinal horizontal slots 35 in which the opposite ends of a pivot pin 36 slide which connect the members of that pair of links which are arranged next to the innermost pair. Upon rocking the shaft 20 for the purpose of projecting or retracting the semaphore arm the pivot pin 36 slides back and forth in the slots 35 of the guide arms so that the semaphore arm is reliably supported during this movement and also maintained in its proper position either in its projected or retracted positions.

In order to utilize this device also as a signal at night a lamp 37 consisting preferably of an electric light bulb is so mounted on the signal arm that in the projected position of this arm this lamp will be arranged in line with the space or opening formed within the space or opening of the ring-shaped signal head, as shown in Fig. 2. This lamp is preferably mounted on one of the links of the outermost pair and its terminals are adapted to be connected with opposite sides of an electrical generator 38 which may be of any suitable form, such as a battery or a dynamo mounted on the vehicle. The electric circuit including this generator and the lamp is preferably opened so as to extinguish the lamp when the semaphore arm is retracted and closed so as to illuminate the lamp when this arm is projected. This opening and closing of the electric circuit is preferably effected automatically by a switch comprising two contacts 39, 40 which are arranged in the circuit of the lamp and generator and mounted on two relatively movable parts of the semaphore arm. As shown in Figs. 3 and 7, this is preferably accomplished by mounting these two switch contacts on the pivots which connect the opposing ends of two pair of adjacent semaphore links so that these contacts are engaged with each other and close the circuit when the semaphore links are projected laterally from the casing, as shown in Fig. 7, but are separated from each other and break the electric circuit when the semaphore links are retracted within the casing. In order to permit of cutting out the electric lamp so that the same will not be illuminated upon projecting the semaphore arm during the daytime a separate cut out switch 41 may be arranged in the electric circuit, as shown in Fig. 1.

Means are provided for automatically opening the lid of the casing preparatory to projecting the semaphore arm through the passageway of the casing and locking the lid in its open position during the time that this arm is projected and also automatically closing the lid after the semaphore arm has been retracted within the casing and locking the lid in its closed position while said semaphore is retracted. These means are preferably associated with the semaphore arm, so that they operate in harmony with the projecting and retracting movement of the same. The preferred means for accomplishing this purpose comprise a vertically swinging three armed lever 42, 43, 44 which is pivotally mounted on the supporting bracket of the semaphore arm preferably by means of a pivot pin 45 connecting this lever at the inner end of its arms with the outer side of one of the bracket arms 34, two of these lever arms 42, 43 being arranged substantially horizontal and provided with a slot 46 which receives one end of the pin 36 while the third arm 44 projects downwardly from its pivot. The last mentioned arm 44 is connected at its lower end by a rod or link 47 with a pin 48 arranged on a crank arm 49 projecting inwardly from the lower part of the lid. The slot 46 is provided with a straight front portion and a downwardly curved rear portion, as shown in Fig. 8, so that the same in effect performs the function of a cam. In the retracted position of the semaphore arm the guiding and pivoting pin 36 engages with the curved inner part of the three armed shifting lever and turns the latter in a direction which causes the same to draw the lid or door of the casing inwardly or into its closed position, as shown by full lines in Figs. 1 and 8, and by dotted lines in Fig. 3. As the pivot pin 36 moves outwardly the same engages with the straight outer part of the slot 46 and causes the three armed shifting lever to be turned in the opposite direction so that the lid or door is moved into its opened position, as shown by full lines in Figs. 2 and 3 and as indicated by dotted lines in Fig. 8. That part of the pivot pin 36 which engages with the slot of the three armed shifting lever therefore operates as a tappet for shifting the lid into its opened or closed position in addition to performing the function of a support for the semaphore arm and also as a pivotal connection between two of its links. While the tappet or shifting pin 36 is in either extreme of its movement the same securely holds the shifting lever in its forwardly or backwardly turned position, thereby holding the lid positively either in its opened or closed position and preventing interference between the lid and the semaphore arm as the latter moves outwardly or inwardly through the passageway of the casing.

It will be apparent from the foregoing that this vehicle signal is positive and reliable in its action, that the same can be easily and quickly operated so as to avoid accidents in case of an emergency and the same contains no delicate parts which are liable to be deranged.

I claim as my invention:

1. A signal device comprising a semaphore arm having a plurality of pairs of pivotally connected links, and a guide pin, a bracket on which the innermost pair of said links is pivoted and which is provided with a guide slot which receives said guide pin, and means for folding and unfolding said links comprising a rock shaft on which one of the innermost links is mounted loosely while the companion innermost link is secured thereto, and a rock arm connected with said shaft.

2. A signal device comprising a semaphore arm having a plurality of pairs of pivotally connected links, and a guide pin, a bracket on which the innermost pair of said links is pivoted and which is provided with a guide slot which receives said guide pin, and means for folding and unfolding said links, comprising a rock shaft on which one of the innermost links is mounted loosely while the companion innermost link is secured thereto, a rock arm connected with said shaft, a shipper rod connected with said arm, and a guide tube in which said rod slides.

3. A signal device comprising a casing having a passageway and a movable lid adapted to open and close said passageway and pivoted to said casing on one side of said passageway and provided with a crank arm, a semaphore arm movable through said passageway into and out of said casing and having a plurality of pairs of pivotally connected links and a shifting pin at the pivotal connection between a pair of said links, a bracket having a slot which receives said pin, a shifting lever which is actuated by said pin, and a connecting rod connecting said lever with said crank arm.

4. A signal device comprising a casing having a passageway and a movable lid adapted to open and close said passageway and pivoted to said casing on one side of said passageway and provided with a crank arm, a semaphore arm movable through said passageway into and out of said casing and having a plurality of pairs of pivotally connected links and a shifting pin at the pivotal connection between a pair of said links, a bracket having a slot which receives said pin, a triple armed shifting lever having two of its arms provided with a cam slot which receives said pin, and a rod connecting the third arm of said lever with the crank arm of the lid.

JAMES J. LANAHA